US005783108A

United States Patent [19]

MacKay

[11] Patent Number: 5,783,108
[45] Date of Patent: Jul. 21, 1998

[54] INK COMPOSITION

[75] Inventor: Simon Donald MacKay, Victoria, Australia

[73] Assignee: Zone Properties Pty Ltd, Victoria, Australia

[21] Appl. No.: 881,156

[22] Filed: Jun. 24, 1997

[30] Foreign Application Priority Data

Jun. 24, 1996 [AU] Australia .................... PO0629

[51] Int. Cl.$^6$ ................ C09K 11/08; C09D 5/22
[52] U.S. Cl. ................ 252/301.36; 252/301.35; 106/31.32; 106/31.64
[58] Field of Search ............ 252/301.35, 301.36; 106/31.32, 31.64, 31.15

[56] References Cited

U.S. PATENT DOCUMENTS 4,481,422  11/1984  DeMarco et al. ............ 252/301.36
5,478,381  12/1995  Ohiwa et al. ............... 106/21 A

FOREIGN PATENT DOCUMENTS

10585/92  8/1992  Australia .
96/23030  8/1996  WIPO .

*Primary Examiner*—Melissa Bonner
*Attorney, Agent, or Firm*—Dennison, Meserole, Pollack & Scheiner

[57] ABSTRACT

An ink composition comprising an ultraviolet radiation curable carrier incorporating a coloured base pigment which emits visible radiation of a first wavelength, and a quantity of luminescent pigment which emits visible radiation by phosphorescent decay or under illumination by long-wave ultraviolet radiation at a second wavelength wherein the concentration of said luminescent pigment is higher than that required just to ensure the visible escape of luminescent radiation from said composition.

4 Claims, No Drawings

INK COMPOSITION

FIELD OF THE INVENTION

This invention relates to ultraviolet radiation (UV) curable inks, paints and coating compositions and in particular to a UV curable ink composition exhibiting daylight visibility at a first wavelength and luminescence at a second distinctive wavelength.

DESCRIPTION OF RELATED ART

The existence of luminescent or fluorescent inks having a mixed proportion of visible light activated pigments and long wavelength activated phosphor pigments, is known. Such inks are used in many safety signs and instrument gauges and dials; for example in automobiles where dials are required to be visibly numerated in daylight as well as clearly numerated in relative darkness. Such inks are a combination of visible light activated pigments and phosphor pigments in an acrylic resin which is chosen for transparency to long wave radiation. The proportions of visible light activated pigment to phosphor pigment is generally chosen to minimize the difference between daytime colour and night-time colour with the proportion of phosphor pigments to resin provided at about 6 parts phosphor to 4 parts resin.

The previously known ink compositions; however, suffer from an inability to be cured by ultraviolet light. Accordingly, the currently known ink compositions which combine visible light activated pigments and luminescent or fluorescent pigments are unsuitable for use in the printing of paper goods; for example. books where a rapid ink curing is essential.

The ink composition of the invention has been developed for application to printing techniques where a rapid curing of the applied ink is required to allow efficient production of printed works.

The use of ink which is curable under ultraviolet radiation is well known and used in many applications. The production of children's colouring books is one example where high density and bulky inks are desirable in order to provide thick and heavy outlines on the printed page to produce high definition outlines which are easy for young children to see and use. The application of such bulky masses of ink require enhanced curing techniques to ensure a complete, rapid and hard drying of such inks with good adhesion to ensure they resist the abuse of children's colouring pencils without undue damage.

Accordingly, the production of children's colouring books often relies on ultraviolet radiation curing of the outline inks and such inks are available in a wide range of colours.

In order to enhance the appeal of such colouring books, endeavours have been made to use luminescent, including fluorescent and phosphorescent, dyes or pigments in such inks which glow under long wavelength ultraviolet light or in the dark. However, the use of such luminescent dyes alone in the preparation of inks for use in colouring books suffers from a number of imperfections. In the first instance, luminescent inks radiate daylight and luminescent radiation of similar wavelengths. As such, the colour of luminescent ink in daylight is not significantly different, to the untrained eye, to the colour of the same ink during luminescence in the absence of daylight. Accordingly, beside the novelty of a colouring book glowing in the dark, the use of luminescent ink per se does not have any particular appeal.

More importantly, however, the base dye or pigment tends to inhibit the transmission of the luminescent radiation, thus producing relatively weak luminescence in the absence of light.

In addition, the range of suitably luminescent colours is limited, with only a few colours able to produce a suitable intensity of radiation to be classified as effective luminescent inks. These include:
$Zn_2GeO_4$:Mn (green)
$Y_2O_2S$:Eu (red)
$BaMg_2Al_{16}O_{27}$:Eu (blue)
as well as
Zno:Zn
$Y_2O_2S$:Eu
$Sr_5(PO_4)_3CC$:Eu It has been proposed that, in order to enhance the appeal of luminescently outlined colouring books, standard UV curable ink mixed with a first colour is combined with phosphor pigments of a second and distinct colour in an endeavour to produce a UV curable ink which would radiate the first colour in daylight; and, in the absence of daylight, would radiate only the second luminescent colour; thereby effecting a dramatic colour change from daylight to darkness.

However, it has been found that when a sufficient amount of luminescence, phosphor pigments was added to the standard UV curable ink mixed with a first colour, the phosphor pigments inhibited the ability of the ink to be cured under UV radiation.

Therefore, although it was possible to produce a composite ink of a clear UV curable carrier having a daylight visible dye in combination with phosphor pigments which radiated at a different wavelength, such dyes were found to loose the ability to quickly cure under UV radiation and were unsuitable for use in colouring books.

It is therefore desirable to provide an improved ink composition which is quickly curable under UV radiation, and which exhibits luminescence in the absence of daylight.

It is also desirable to provide an improved ink composition which is relatively economic to manufacture and use.

It is also desirable to provide an improved ink composition which is able to be printed onto a variety of substrates and quickly cured by UV radiation.

SUMMARY OF THE INVENTION

According to one aspect of the invention there is provided an ink composition comprising by weight:
(a) between 10% and 45% of an ultraviolet radiation curable carrier;
(b) between 0.001 and 10% of a coloured base dye or pigment which emits visible radiation of a first wavelength;
(c) between 35% and 80% of luminescent pigment which emits visible radiation by phosphorescent decay or under illumination by long-wave ultraviolet radiation at a second wavelength;
(d) between 0% and 25% reducer.

The ink composition of the present invention has a concentration of the luminescent pigment which is higher than that which would otherwise be required ensure the visible escape of luminescent radiation from said composition.

Preferably, the composition of the invention contains between 20 and 35% of the ultraviolet radiation curable carrier, between 0.003 and 1% of the colored base dye or pigment and between 25 and 50% of the luminescent pigment.

Preferably, the first and second wavelengths are of sufficiently different value to produce distinctive visible radiations from said coloured base dye or pigment and said luminescent pigment respectively.

Preferably, the luminescent pigment is phosphorescent.

The base dye and luminescent pigment are preferably selected to minimize the potential masking, one of the other, so as to maximize the light output from both the base dye and luminescent pigment.

The base dye is most preferably selected to emit visible radiation at a wavelength of about 4000 to 4500 Å. The luminescent pigment is most preferably selected to emit visible radiation at wavelength of about 5500 Å and 6000 Å.

In another aspect, the invention provides a colouring book characterized by the use of the ink composition of the invention for at least defining the outlines of characters or colouring zones in said book.

DETAILED DESCRIPTION OF INVENTION

The invention will now be described with particular reference to a child's colouring book which uses the ink composition of the invention as a particularly preferred embodiment.

The ink composition of the invention is made up by combining a standard UV curable carrier such as either of those sold under the trade mark "SOLABORD" or the trade mark "SOLAGLASS", which incorporates a coloured base dye which emits visible radiation, or light, at a selected wavelength. Such standard carriers are adapted for curing with UV radiation in order to enhance the speed, completeness and durability of the carrier and incorporated dye once it is fixed to the page.

The ink composition of the invention involves mixing the aforesaid UV curable carrier (with its base coloured dye, that has been selected particularly to compliment the subsequent luminescent feature of the composition) with a luminescent pigment. The luminescent pigment may be selected either as one which produces the highest level of visible radiation output as a result of the decay of said luminescent pigment in the absence of visible light, or as one which produces an output for an extended, predetermined period. Such a luminescent pigment is mixed with the aforesaid carrier and its incorporated base dye.

In addition to the above, other conventional components may be added to the composition as required including: wetting agents, waxes, thickeners, drying retardants or accelerators, anti-foaming agents, extenders, surfactants, binders, rheology modifiers, preservatives, solvents and the like.

In order to achieve the aim of the invention which, amongst other things, is to retain the optimal UV curability of the carrier notwithstanding the addition of luminescent pigments, a particularly high level and concentration of luminescent pigment is incorporated into said carrier beyond the normal amount of luminescent pigment which would otherwise be required to be mixed into the composition in order to ensure just that the visible radiation resulting from luminescent decay would in fact be visible over and above the base coloured dye. It is the use of a particularly high concentration of luminescent pigment in the composition of the invention that very surprisingly gave rise to the resurrection of the optimal UV curable capacity of the carrier which was lost when the composition contained only a sufficient concentration of luminescent pigment to ensure visibility upon luminescent decay. The mode of action of the invention is not fully understood but it may be speculated that luminescent pigments while being partially UV transparent, reflect UV radiation and upon reaching a suitable concentration in a composition to ensure the visibility of luminescent decay visible radiation, such powders are concentrated enough to effectively block the transmission of UV radiation and therein inhibit the curing of such a carrier in which the luminescent powder has been mixed. However, upon further concentration of said luminescent powder, it is speculated that the powder begins to act as a conductor of UV rays therein re-establishing that the ability of the composition to transmit UV radiation and accordingly re-establishing the UV curability of said composition.

The selection of base dye colours and the luminescent pigment colour is not critical or essential to the invention, however a careful choice of these colours allows a complimentary effect to occur enhancing the use of a child's colouring book which is one particular application of the invention. In particular, it is preferred that the base dye is selected with a wavelength output capable of producing a colour in the violet or purple range. One example of a base dye or pigment is that sold under the trade mark "VIOSPEED". The luminescent pigment is most preferably selected to emit the colour yellow or yellow-green as it is this colour, amongst the range of available colours in luminescent powder, that has the most striking effect on the eye and is the most appealing to children. The combination of the violet coloured base dye which is visible in daylight is sufficient to disguise any residual colour of the incorporated green-yellow luminescent powder such that during the day, a colouring book outlined with the ink composition of the invention appears to contain only violet or purple coloured outlines.

Upon reduction of the light level or elimination completely of available light, the visible radiation becomes a result of the decay of the phosphorescent pigment being the sole remaining source of light emission of the ink composition, and the green-yellow coloured luminescent pigment has been found to be particularly able to transmit and escape the base dye colour of violet in such a manner that upon reduction in light level, the inked in outlines of the colouring book of the invention make a dramatic change from violet to bright green-yellow. In addition, the above choice of colours allows the alternate colour feature of the outline of the book to be retained even when the ink composition has been coloured over or partially damaged by the effect of colouring-in using pencils. The outlines of the glow ink remain easy to see in the dark and retain the exciting and novel image and transformation from purple outline to green-yellow outline even after being fully coloured in.

It is also desirable that the ink composition of the invention include a reducer, or thinners, to improve the flowability of the ink composition and to make it easier to print using the ink. Such reducers are well known in the art and do not need to be described in any further detail.

EXAMPLE 1

In one example of the invention, an ink composition was formulated by mixing 2 parts by weight of a yellow-green luminescent powder with one part by weight of UV curable clear carrier having incorporated an amount of base dye.

The composition was found to be curable by UV radiation whilst having sufficient luminescent output to ensure visible luminescence in the absence of ambient light.

EXAMPLE 2

An ink composition according to the invention comprises:
between 1 and 10 grams liquid violet pigment dye sold as "VIOSPEED"

between 10 and 12 kilograms of UV curable carrier such as "SOLAGLASS"

between 2 and 6 kilograms of reducer, to improve the printing characteristics of the ink between 10 and 20 kilograms of phosphorescent pigment powder.

This composition was found to be quickly curable by UV radiation, thus enabling the ink composition to be used to print colouring books and the like. The cured ink had a sufficient luminescent output to ensure a good visible luminescence in the absence of light, that luminescence being of a green-yellow colour. In light, the printing was a bright violet colour. The violet pigment did not inhibit the green-yellow wavelength of the luminescent pigment.

I claim:

1. An ink composition comprising, by weight:

a) 20 to 35% of an ultraviolet radiation curable carrier;

b) 0.003 to 1.0% of a colored base dye or pigment which emits usable radiation of a first wavelength;

c) 35 to 50% of a luminescent pigment which emits visible radiation by phosphorescent decay or under illumination by long-wave ultraviolet radiation at a second wavelength; and d) 0 to 25% of a reducer to improve flow properties of the composition.

2. A composition according to claim 1, wherein said colored base dye or pigment has a violet color and the luminescent pigment emits radiation having a green yellow wavelength.

3. A composition according to claim 1, wherein said colored base dye or pigment emits visible radiation at a wavelength of about 4000 to 4500 Å and said luminescent pigment emits visible radiation at a wavelength of about 5500 to 6000 Å.

4. A composition according to claim 1, wherein the luminescent pigment is phosphorescent.

* * * * *